United States Patent
Corless et al.

(10) Patent No.: US 6,559,621 B2
(45) Date of Patent: May 6, 2003

(54) HYBRID ENERGY STORAGE DEVICE CHARGE EQUALIZATION SYSTEM AND METHOD

(75) Inventors: Adrian J. Corless, New Westminster (CA); David Leboe, Vancouver (CA)

(73) Assignee: Cellex Power Products, Inc., Richmond (CA)

(*) Notice: Subject to any disclaimer, the term of this patent is extended or adjusted under 35 U.S.C. 154(b) by 0 days.

(21) Appl. No.: 09/935,076

(22) Filed: Aug. 22, 2001

(65) Prior Publication Data

US 2002/0171397 A1 Nov. 21, 2002

Related U.S. Application Data

(60) Provisional application No. 60/292,743, filed on May 21, 2001.

(51) Int. Cl.[7] ............................................. H02J 7/00
(52) U.S. Cl. .................. 320/103; 307/9.1; 318/139
(58) Field of Search ........................ 320/103, 104, 320/126, 119; 318/139; 307/9.1; 700/297; 180/65.8

(56) References Cited

U.S. PATENT DOCUMENTS

| | | | |
|---|---|---|---|
| 3,821,626 A | 6/1974 | Maver et al. ................. 320/3 |
| 4,380,726 A | 4/1983 | Sado et al. .................. 320/48 |
| 4,436,793 A | 3/1984 | Adlhart ....................... 429/17 |
| 4,650,729 A | 3/1987 | Nakamura et al. ............. 429/61 |
| 4,670,702 A | 6/1987 | Yamada et al. ............... 320/21 |
| 4,677,037 A | 6/1987 | Takabayashi ................. 429/9 |
| 4,741,978 A | 5/1988 | Takabayashi ................. 429/23 |
| 4,839,246 A | 6/1989 | Takabayashi ................. 429/12 |
| 4,839,574 A | 6/1989 | Takabayashi ................. 320/3 |
| 4,883,724 A | 11/1989 | Yamamoto .................. 429/23 |
| 4,931,947 A | 6/1990 | Werth et al. ................. 364/492 |
| 4,961,151 A | 10/1990 | Early et al. ................. 364/492 |
| 4,962,462 A | 10/1990 | Fekete ....................... 364/492 |
| 5,075,813 A | 12/1991 | Takabayashi ................. 361/84 |
| 5,139,894 A | 8/1992 | Mizuno et al. ............... 429/9 |
| 5,332,630 A | 7/1994 | Hsu ........................... 429/20 |
| 5,334,463 A | 8/1994 | Tajima et al. ................ 429/9 |
| 5,601,936 A | 2/1997 | Dudfield et al. .............. 429/13 |
| 5,623,194 A | 4/1997 | Boll et al. ................... 320/15 |
| 5,631,532 A | 5/1997 | Azuma et al. ................ 320/5 |
| 5,710,504 A * | 1/1998 | Pascual et al. .............. 180/65.8 |
| 5,710,699 A | 1/1998 | King et al. .................. 363/132 |
| 5,714,874 A | 2/1998 | Bonnefoy .................... 323/299 |
| 5,760,488 A | 6/1998 | Sonntag ...................... 307/10.1 |
| 5,780,980 A | 7/1998 | Naito ......................... 318/139 |
| 5,820,172 A | 10/1998 | Brigham et al. .............. 290/40 |
| 5,929,595 A | 7/1999 | Lyons et al. ................. 320/104 |
| 5,945,808 A | 8/1999 | Kikuchi et al. .............. 320/132 |
| 6,011,379 A | 1/2000 | Singh et al. ................. 320/132 |
| 6,214,484 B1 | 4/2001 | Hauer ........................ 429/9 |

* cited by examiner

Primary Examiner—Gregory J. Toatley, Jr.
(74) Attorney, Agent, or Firm—Oyen Wiggs Green & Mutala

(57) ABSTRACT

A system and method for improving the performance of a hybrid power supply apparatus comprising a power generating device, such as a fuel cell, and a primary energy storage device, such as a battery. The purpose of the invention is to provide an equalization charge to the battery from a source other than the fuel cell when the battery achieves a predetermined state of charge condition, thereby avoiding the need to operate the fuel cell in a low power output mode. When the predetermined state of charge condition is detected by a controller, the fuel cell is shut-down. In one aspect of the invention the equalization charge is provided to the battery by a secondary energy storage device, such as a plurality of capacitors or secondary batteries. The predetermined state of charge condition may be satisfied, for example, when the state of charge of the battery exceeds a predetermined threshold, such as 80% of the battery's storage capacity, for a predetermined period of time. In some aspects of the invention, the secondary energy storage device may also be connectable to the load. Preferably the system also includes a DC/DC converter for regulating current flow between the fuel cell and the storage devices.

37 Claims, 9 Drawing Sheets

HYBRID ENERGY STORAGE DEVICE CHARGE EQUALIZATION SYSTEM AND METHOD

CONTINUITY

Priority is claimed from U.S. Provisional Patent Application Ser. No. 60/292,743, filed May 21, 2001.

TECHNICAL FIELD

This application relates to a system and method for improving the performance of a hybrid power supply apparatus comprising a power generating device, such as a fuel cell system, and an energy storage device, such as a battery. The purpose of the invention is to provide an equalization charge to the battery from a source other than the power generating device when the battery achieves a predetermined state of charge condition, thereby avoiding the need to operate the power generating device in a low power output mode.

BACKGROUND

Hybrid power supply systems comprising a power generating device and an energy storage device are well known in the prior art. In recent years interest has grown in using fuel cells as power generating devices in such hybrid systems. The fuel cell is used to charge a storage battery which in turn supplies power to a load on an "on-demand" basis. Alternatively, the fuel cell and the battery may jointly supply power to the load depending upon the power requirements.

Many fuel cell systems include fuels processors such as reformers for converting conventional fuels to hydrogen-enriched gas for processing by the fuel cell. In general, the combination of a fuel cell and a reformer makes it difficult for the power generating device to respond quickly to variations in external load since the response time of the reformer is slow. This is particularly the case for loads that fluctuate substantially over time. For example, electric lift vehicles have a pattern of power usage or "duty cycle" which is characterized by loads which fluctuate substantially during the course of a work shift. Hybrid power supply systems offer several advantages in such applications. The addition of a charged energy storage means enables the hybrid system to respond quickly to power demand surges, while maintaining the advantages of a fuel cell system, including extended operating times, low emissions and the flexibility to utilize many readily available fuels. Further, in hybrid systems the size of the power generating device may be minimized to enhance system efficiency and reduce cost.

Hybrid power supply systems are known in the prior art for use in applications subject to sudden load fluctuations. U.S. Pat. No. 4,883,724, Yamamoto, issued Nov. 28, 1989 relates to a control unit for a fuel cell generating system which varies the output of the fuel cell depending upon the state of charge of the battery. In particular, a DC/DC converter is connected between the output of the fuel cell and the battery and is responsive to a control signal produced by a controller. The purpose of the Yamamoto invention is to ensure that the storage battery is charged for recovery within the shortest possible time to reach a target remaining charge capacity under charging conditions that do not cause deterioration of performance of the battery. When the charged quantity of the battery is recovered to the target value, the controller lowers the output of the fuel cell. In the case of no external load, such as during extended interruptions in the operation of the lift truck, the fuel cell is controlled to shut-down after the storage battery is fully charged.

One limitation of the Yamamoto system is that the control algorithm is designed for prolonging the useful life of the storage battery rather than the fuel cell. By varying the fuel cell output to charge the storage battery for recovery within the shortest possible time, the long-term performance of the fuel cell is compromised. For example, frequent changes in fuel cell power output degrade the performance and lifetime of the fuel cell. Further, depending upon the state of charge of the battery, the fuel cell (and hence the fuel processor) may operate for extended periods in a low power output mode which is undesirable.

U.S. Pat. No. 4,839,574, Takabayashi, also discloses a generator system utilizing a fuel cell and reformer. Depending upon the state of charge of the battery the output of the fuel cell may be adjusted in a stepwise fashion. In the Takabayashi system the amount of raw material supplied to the reformer is maintained constant within a range of charged energy to ensure stable operation of the reformer. However, depending upon the state of charge of the battery, the fuel cell and the reformer may once again operate for extended periods in a low output mode.

Typically, using sealed lead acid batteries as an example, a constant voltage charge method is the preferred means for charging the battery cells. Under a constant voltage regime inrush currents are limited by the internal resistance of the battery. Thus, when the battery is in a low state of charge and the internal resistance is low, inrush currents can be very large and energy can be restored to the battery very quickly. As the battery becomes charged, it reaches a transition point where a sudden rise in internal resistance occurs and, under constant voltage, the battery will accept less and less current. This self-regulating effect prevents overcharging of the battery, leading to longer battery lifetimes. Typically such constant voltage charge regimes are conducted at the "float" or "equalization" voltage which is the recommended voltage at which the batteries can be maintained at high states of charge.

Similarly, other advanced batteries such as Nickel Metal Hydride (NiMH) batteries may be charged at higher currents in a constant voltage or constant current regime until a transition point occurs. After this transition a low current equalization charge is required to return the complete capacity of the battery and to ensure that the individual cells within the battery are brought to an approximately equal charge state.

Most of the charging and discharging of the battery is done in the "bulk region" below the transition point. Once the battery reaches the transition point or charge threshold (e.g. at approximately 80% of its total charge capacity), most prior art systems step down the output of the fuel cell and operate the fuel cell in a low power mode until the battery is fully charged (assuming the absence of an external load). In other words, a reduced current equalization charge is provided by the fuel cell to the battery in the "absorption" and "float" regions of the battery above the transition point. Although it is necessary to return the battery to a fully charged state to ensure sufficient capacity to meet future load demands, it is not desirable to operate the fuel cell and fuel processor in low power output modes for extended periods of time to provide such an equalization charge.

A need has therefore arisen for a system and method for providing an equalization charge to a storage battery in a hybrid system from a source other than the fuel cell once the battery achieves a predetermined state of charge condition, such as a threshold state of charge for a predetermined period of time.

SUMMARY OF INVENTION

In accordance with the invention, a hybrid power supply system for supplying electrical power to a load is disclosed. The system includes a power generating device, such as a fuel cell system; a first energy storage device chargeable by the power generating device and electrically connectable to the load; a first detector for measuring the state of charge of the first energy storage device; a second energy storage device chargeable by the power generating device and electrically connectable to the first energy storage device; and a controller for receiving input from the first detector. The controller causes the second energy storage device to provide an equalization current to the first energy storage device when a first predetermined state of charge condition is detected by the controller. For example, the first predetermined state of charge condition may occur when the measured state of charge of the first energy storage device exceeds a first threshold value for a predetermined amount of time.

The power generating device is operable in alternating charging and shut-down or non-charging modes. The controller causes the power generating device to switch from the charging mode to the shut-down mode when the first predetermined state of charge condition is detected. The second energy storage device delivers the equalization charge to the first energy storage device while the power generating device is in the shut-down mode until the first energy storage device is fully charged. The invention avoids the need to operate the power generating device in a low power output mode for extended periods of time.

The system may also comprise a second detector for measuring the state of charge of the second energy storage device. The controller causes the power generating device to power back on when a second predetermined state of charge condition is detected. The second predetermined state of charge condition may occur, for example, when the measured state of charge of one or both of the first and second energy storage devices falls below a second threshold value for a predetermined amount of time.

The second energy storage device may also be electrically connectable to the load. In one aspect of the invention, the second energy storage device delivers current to the load when a third predetermined state of charge condition has occurred. For example, the third predetermined state of charge condition may occur when the measured state of charge of the first energy storage device is a state of charge approximately equivalent to the measured state of charge of the second energy storage device. This feature prevents over-discharging of the first energy storage device and increases the stored energy available to the load.

As indicated above, the power generating device may comprise a fuel cell. The system also preferably includes a DC/DC power converter connected between the fuel cell and the first and second energy storage devices for controlling the current delivered to the energy storage devices. The first and second energy storage devices may comprise, for example, batteries or supercapacitors.

The invention also relates to a method of operating a hybrid power supply apparatus including a power generating device adjustable between charging and shut-down modes and further including first and second energy storage devices chargeable by the power generating device. At least one of the first and second energy storage devices is connectable to a load for delivering electrical power thereto. The method includes the steps of (a) operating the power generating device in the charging mode to deliver charging current to the first and second energy storage devices and to the load; (b) repeatedly measuring the state of charge of the first energy storage device; (c) adjusting the power generating device from the charging mode to the shut-down mode when the measured state of charge of the first energy storage device satisfies a first predetermined state of charge condition; and (d) providing an equalization current from the second energy storage device to the first energy storage device while the power generating device is in the shut-down mode until the measured state of charge of the first energy storage device reaches approximately its full storage capacity. The first predetermined state of charge condition may occur, for example, when the state of charge of the first energy storage device exceeds a first threshold value for a predetermined length of time, the first threshold value being a percentage of the full storage capacity of the first energy storage device.

The method may further include the step of adjusting the power generating device from the shut-down mode to the charging mode when the measured state of charge of the first energy storage device and/or the second energy storage device satisfies a second state of charge condition, for example when one of such states of charge is below a second threshold value for a predetermined period of time.

The method may also optionally include the step of electrically connecting both of the first and second energy storage devices to the load for jointly delivering electrical power thereto. In another embodiment, the power generating device may be adjusted from the charging mode to the shut-down mode when the combined states of charge of the first and second energy storage devices exceed a predetermined amount.

In one aspect of the invention the apparatus is operable in successive alternating first and second operating cycles. In the first operating cycle, the second energy storage device delivers an equalization current to the first energy storage device when the power generating device is in the shut-down mode. In the second operating cycle the first energy storage device delivers an equalization current to the second energy storage device when the power generating device is in the shut-down mode. Hence both storage devices are periodically equalized and returned to full capacity and the fuel cell is not required to operate in a low power output regime.

BRIEF DESCRIPTION OF DRAWINGS

In drawings which illustrate embodiments of the invention but which should not be construed as restricting the spirit or scope of the invention in any way.

DESCRIPTION OF INVENTION

Figure 1:
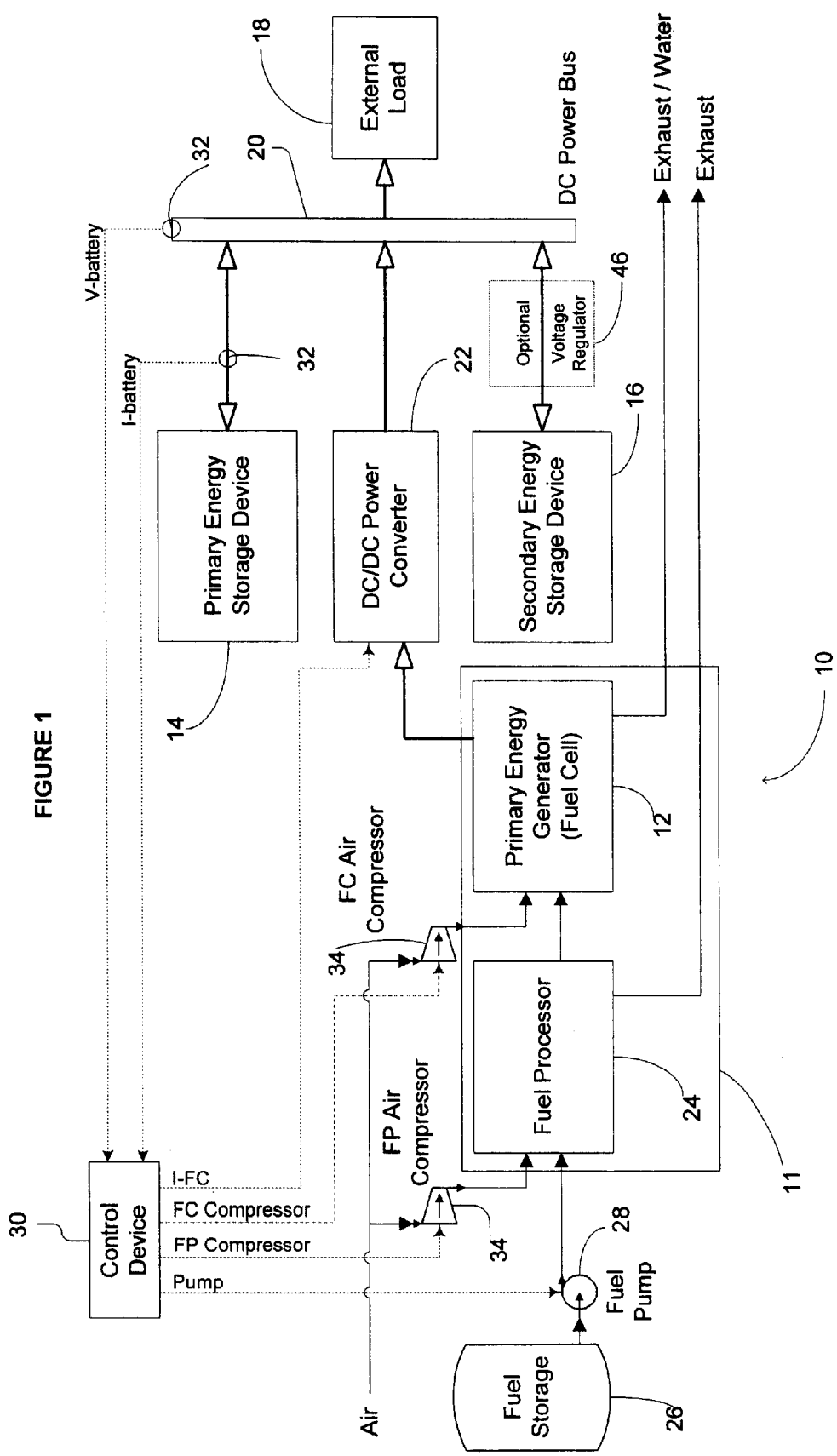
FIG. 1 is a schematic diagram showing the hybrid fuel cell/storage device architecture and charging characteristics of the applicant's system.

FIG. 1 illustrates schematically the general system architecture of the applicant's hybrid power supply device 10. Power supply device 10 is "hybrid" in character since it includes both a power generating device 11 and separate energy storage means, such as primary energy storage device 14 and secondary energy storage device 16. As discussed further below, power generating device 11 may comprise, for example, the combination of a fuel cell 12 and reformer 24. Energy storage devices 14, 16 may comprise, for example, batteries or capacitors or combinations thereof. Storage devices 14, 16 supply current to a load 18 via a DC power bus 20. A conventional DC/DC power converter 22 is also provided for converting raw DC power outputted by power generating device 11 and delivering conditioned power to storage devices 14, 16 or to load 18 via bus 20. Power converter 22 may also be employed to enable delivery of electrical current between storage devices 14, 16 via bus 20 in an equalization mode described below.

Hybrid power supply device 10 may employ various types of fuels. In embodiments of the invention employing a fuel cell 12, readily available fuels such as methanol and propane (LPG) may be used. In such cases, power generating device 11 includes a fuel processor, such as reformer 24, for converting raw fuel to substantially pure hydrogen or hydrogen-enriched gas suitable for use by fuel cell 12. Reformer 24 is coupled to fuel storage chamber 26 with suitable fuel lines. A fuel pump 28 may be provided for delivering fuel from chamber 26 to reformer 24 (FIG. 1).

A computer controller 30 which receives input from various sensors, including voltage and current sensors 32, controls charging of primary and secondary storage devices 14, 16 as discussed further below. Controller 30 may also control the operation of fan blowers 34 which circulate air through device 10 to maintain the operating temperature of the various system components within preferred temperature ranges and supply reactants to the fuel cell 12 and reformer 24.

The choice of power generating device 11 is not a critical feature of the present invention. For example, device 11 may comprise a fuel cell 12, a conventional internal combustion engine or any other device capable of generating electrical power.

Figure 2:
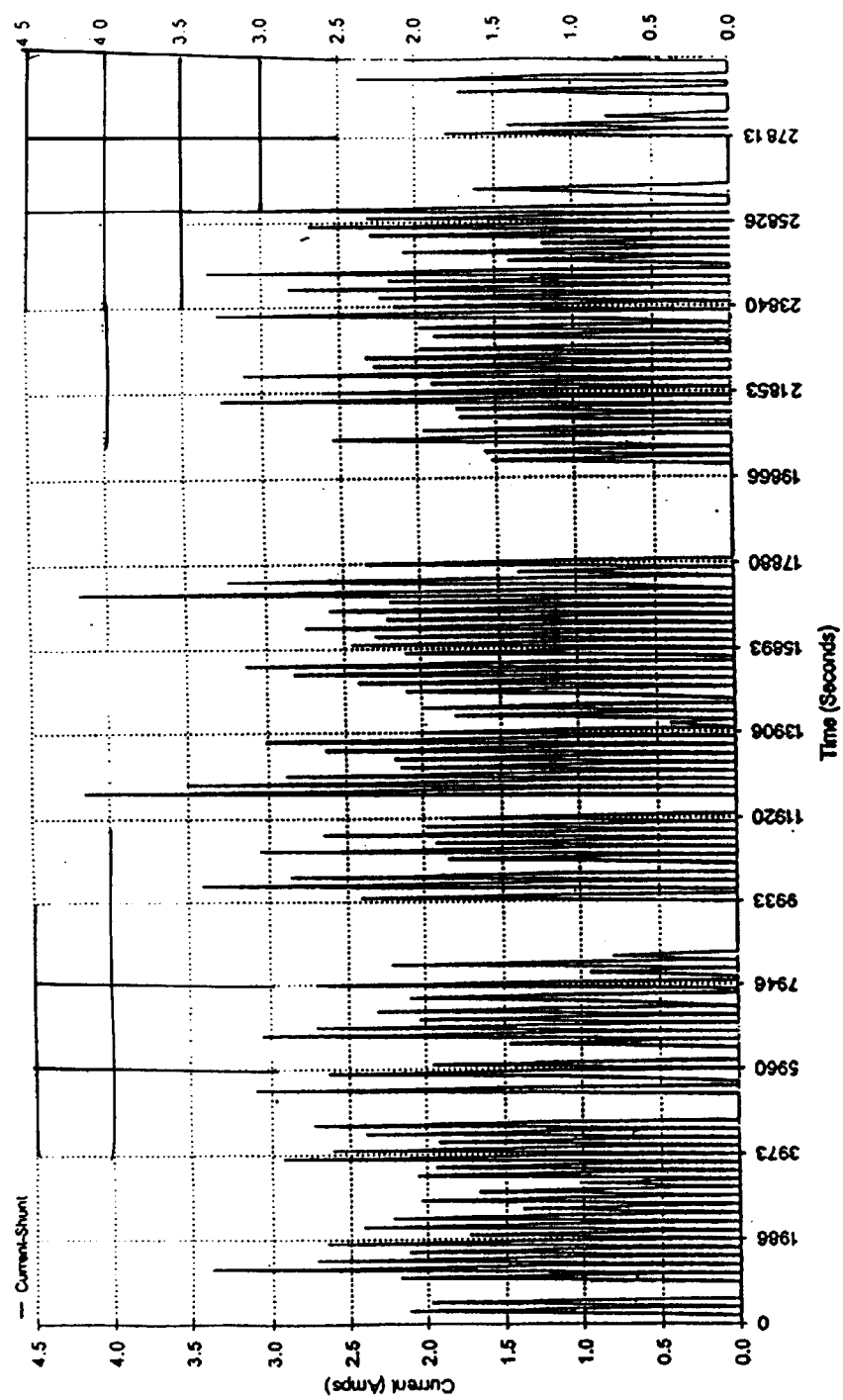
FIG. 2 is a graph illustrating a characteristic duty cycle of an electric lift vehicle.

As will be appreciated by a person skilled in the art, hybrid power supply device 10 is suitable for supplying electrical energy to various types of loads 18. One particular application of the invention is for use in low power products, such as electric non-road vehicles. For example, device 10 may be used as a substitute for conventional lead-acid traction batteries in electric lift trucks, ground support equipment and the like as described in applicant's co-pending application Ser. No. 09/785,878 filed Feb. 16, 2001, the text and drawing of which are incorporated herein by reference. Sudden load fluctuations are commonplace in such vehicles. As shown in FIG. 2, lift trucks typically have a pattern of power usage or "duty cycle" which is characterized by loads which fluctuate substantially during the course of a work shift. In the example of a typical class 3 forktruck, although the average load across an entire seven hour work shift can be less than 1 kW, power requirements on the order of 8–10 kW for short durations are required at irregular intervals to meet operational demands. The work shift may include extended periods when there is no load whatsoever. In general, non-hybrid systems comprising the combination of a fuel cell and a reformer are not capable of responding to such sudden load fluctuations as the response time of the reformer is slow. In a hybrid system as exemplified by applicant's device 10, fuel cell 12 is used to charge a storage battery (such as primary or secondary energy storage device 14, 16) which in turn jointly (i.e. together with fuel cell 12) supplies power to load 18 on an "on-demand" basis.

One of the drawbacks of conventional hybrid systems is that the state of charge of the storage battery must always be high enough to ensure that the battery is capable of responding to high current requests by the lift truck or other fluctuating load (even though the average power requirement is relatively low). As will be apparent to a person skilled in the art, most of the charging and discharging of a battery is done in a "bulk region" below a transition point when charge current must be limited (for example, due to a rise in internal resistance within the battery). Approximately 80% of battery capacity is returned in the bulk charge region. Under a constant voltage charge regime large charge currents can be delivered to the battery in the bulk charge regime, resulting in correspondingly high charge rates. Above the bulk charge region, currents must be limited to maintain the batteries within acceptable operating voltages. When the transition point is reached the battery enters an "absorption" mode or region where typically the last 20% of the battery capacity is returned. In the absorption region the charging voltage can be held constant and the battery current can be allowed to reduce (i.e. the battery self-regulates its current) or controlled charge currents can be reduced accordingly based on a detection of an acceptable maximum voltage. The battery voltage may be maintained at a constant float level until the battery current, in amps, reduces to approximately C/50 to C/100, where C is the amp-hour rating of the battery or until 110% of the battery's capacity is returned. This voltage limit will maintain the full charge condition in the battery without causing battery damage, such as by boiling electrolyte, hydrogen off-gassing etc.

As indicated above, it is important in many hybrid power supply applications to return the storage battery to a fully charged, or close to a fully charged state, in order to both maintain capability to respond to future load demands and to ensure adequate battery lifetimes. When the battery enters the absorption region discussed above the charging current supplied to return the battery to full capacity is reduced. In a conventional hybrid system, this ordinarily means that the operation of the fuel cell or other power generating device is stepped down to a low power output mode. However, extended operation of a power generating device, such as the combination of a fuel cell and a fuel processor, in such a low power output mode is inefficient and reduces the useful service time of the hybrid system.

As described below, the applicant's hybrid power supply device 10 is configured so that the equalization charge required to return primary energy storage device 14 to full capacity above its bulk charge region is provided by secondary energy storage device 16 rather than power generating device 11. In the absence of a load, this permits power generating device 11 to be shut-down once the battery traverses past the transition point from the bulk charge region to the absorption and float regions. As used in this patent application "transition point" refers to the point during the charging of a battery when it is desirable to reduce the charging current to maintain the voltage of the battery below an acceptable limit. The transition point is a function of the battery in-rush currents in the bulk charge region. As used in this patent application "equalization charge" refers to the lower current charge that is the preferable charge strategy at higher battery state of charge (SOC) levels above the transition point (i.e. in the absorption and float charge regions of the battery).

Figure 3:
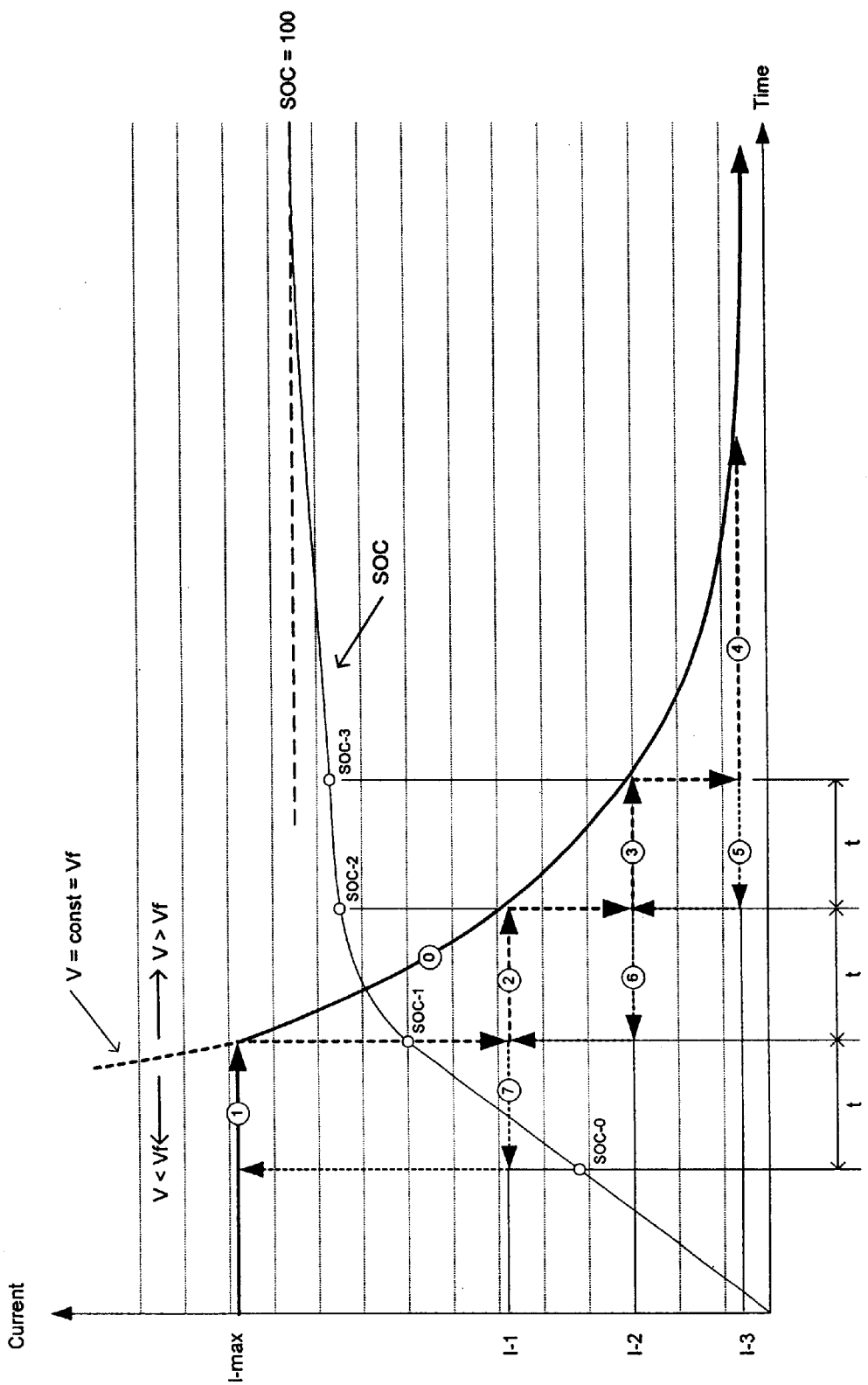
FIG. 3 is a graph showing the charging profile of a battery in an exemplary hybrid power supply system under constant voltage and showing a current charge algorithm comprising a series of discrete current steps.

FIG. 3 is a graph illustrating the charging profile of a battery (e.g. primary energy storage device 14) in an exemplary hybrid power supply system at a plurality of discrete charging currents. The battery is initially charged in the bulk charge region at I-max. Once the SOC of the battery reaches a threshold amount SOC-1 (for example, 80% of the full storage capacity of the battery), the charging current supplied by power generating device 11 is reduced from I-max to I-1. As the SOC of the battery increases in the absorption region of the battery, the charging current is further reduced to levels I-2 and I-3 to maintain the voltage within acceptable limits (for example, as the internal resistance of the battery increases). The charging current is maintained at I-3 (line 4) until the battery is fully charged. As seen in this example, in order to return the battery to a fully charged state, the power generating device 11, such as a fuel cell 12 and reformer 24, must operate for extended periods of time at low output (e.g. at levels I-1, I-2 and I-3) which is undesirable.

Figure 4:
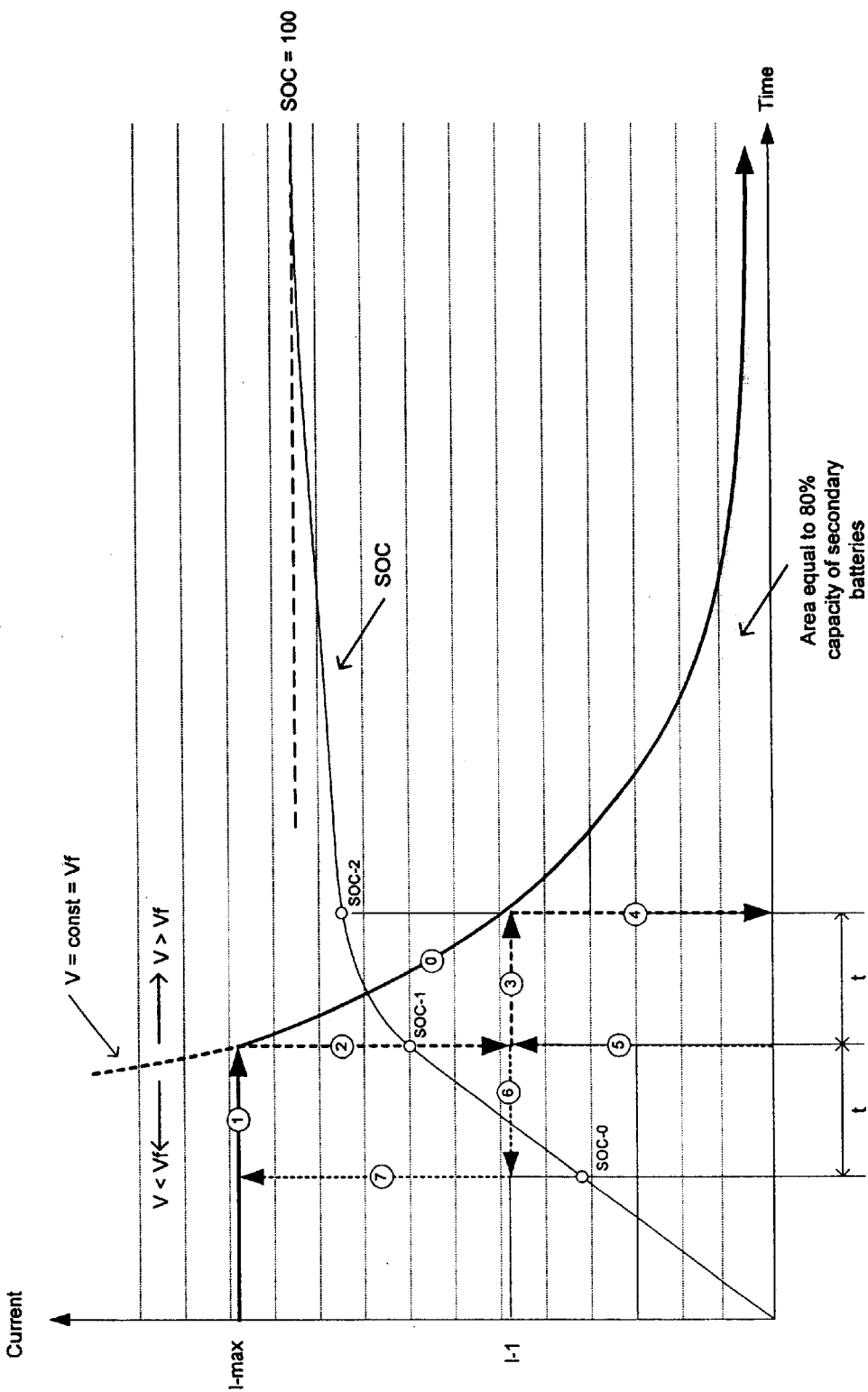
FIG. 4 is a graph illustrating the charging algorithm of a primary energy storage device, such as a battery, utilizing a secondary energy storage device for providing an equalization current thereto.

FIG. 4 illustrates the charging profile of a battery (e.g. primary energy storage device 14) utilizing a source other than power generating device 11 in accordance with the invention for providing the equalization current (such as secondary energy storage device 16). In this example, the charging current is reduced from I-max to I-1 when the measured SOC of the battery reaches SOC-1. When the SOC of the battery increases to SOC-2, power generating device 11 is shut-down and the equalization current required to return the battery to full storage capacity is provided by an alternative source. As described furtherbelow, secondary energy storage device 16 preferably provides the required equalization current. In this example the energy required to charge the primary energy storage device 14 from SOC-2 to full charge capacity is equivalent to about 80% of the storage capacity of the secondary energy storage device 16.

Figure 5:
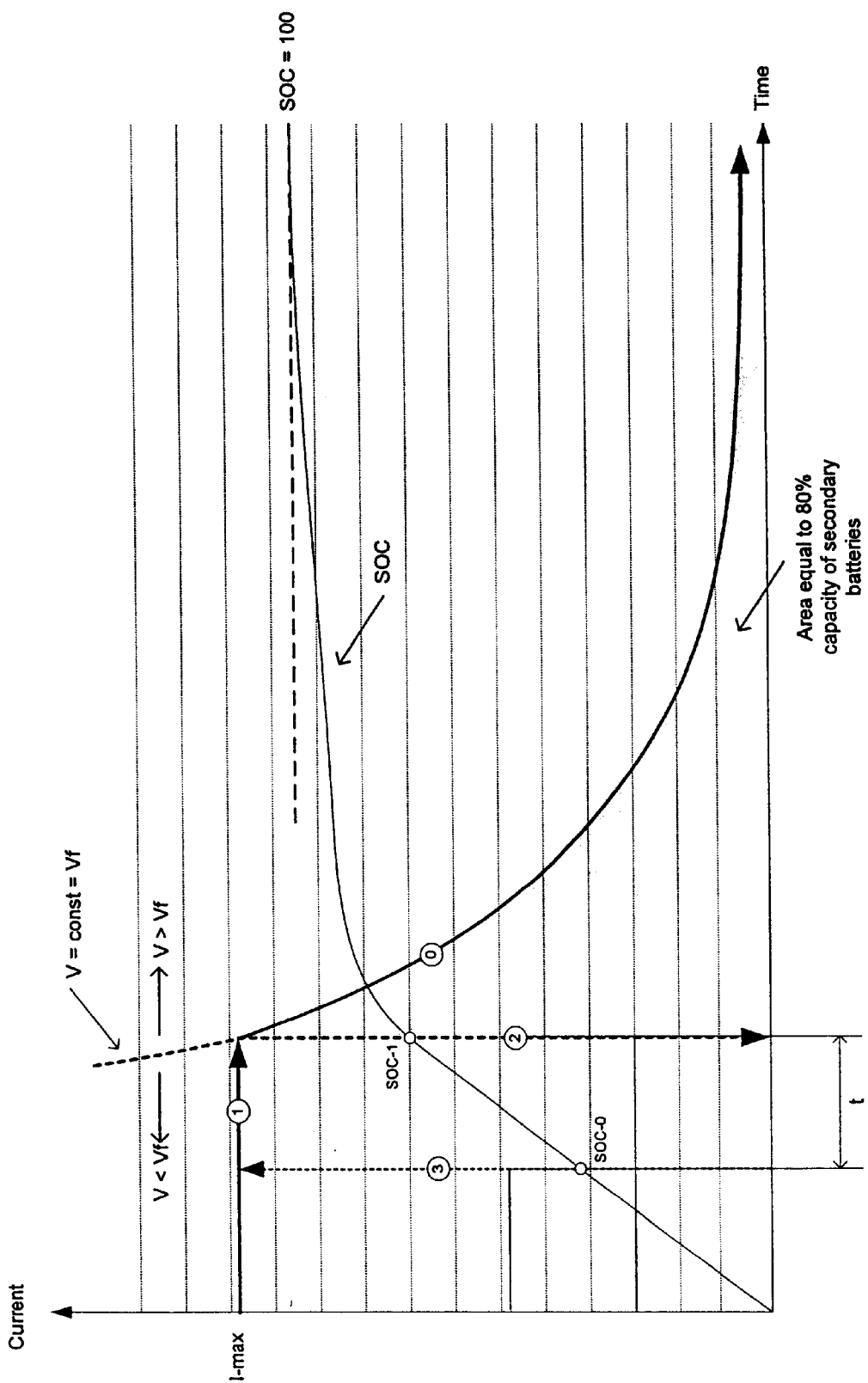
FIG. 5 is a graph showing the charging algorithm of the battery of FIG. 4 showing an ideal case wherein the secondary energy storage device is sized to enable the fuel cell to operate in a single state mode.

With the optimum sizing of the secondary energy storage device 16, the ideal case of true single state steady on/off operation of power generating device 11 may be achieved as shown in FIG. 5. In this example, device 11 is shut-down when the SOC of the battery (e.g. primary energy storage device 14) reaches SOC-1. The current necessary to return the battery from SOC-1 to full storage capacity is provided by an alternative source as in the FIG. 4 example. For example, secondary energy storage device 16 may be configured so that it has sufficient capacity to supply the required current. In this ideal case, power generating device 11 generates maximum current output (I-max) when operating and operating times are minimized. Secondary energy storage device 16 is sized in this example so that the energy required to charge the primary energy storage device from SOC-1 to full charge capacity should be equal to about 80% of the storage capacity of device 16. The provision of a significantly larger device 16 (i.e. providing over capacity) would require a physically larger battery which may be undesirable in some applications.

Figure 6:
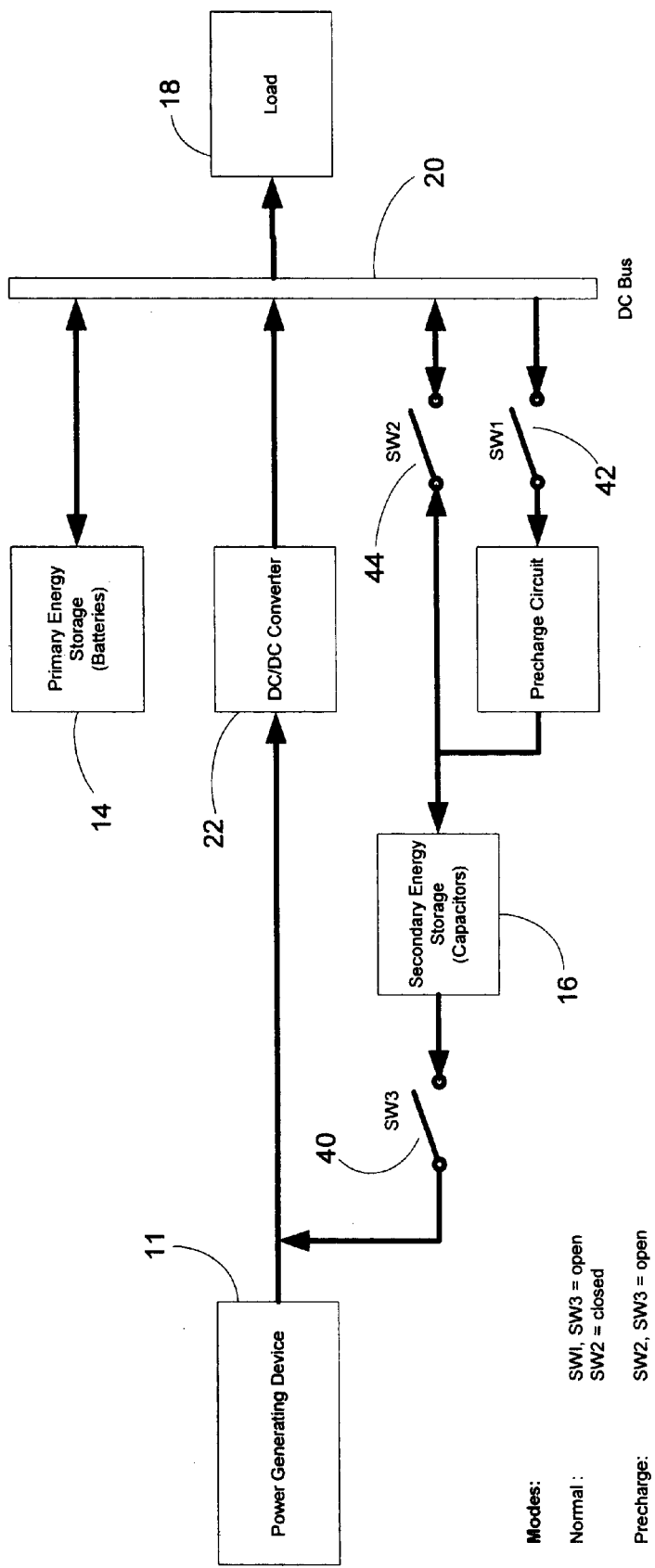
FIG. 6 is a schematic view of a first embodiment of the invention wherein the secondary energy storage device is a bank of capacitors electrically connectable to the load.

FIG. 6 illustrates schematically a first exemplary embodiment of the applicant's hybrid power supply device 10. In this example, power generating device 11 may comprise a combination of fuel cell 12 and reformer 24. As indicated above, other equivalent power generating devices 11 could be substituted. In this embodiment, primary energy storage device 14 comprises a plurality of batteries and secondary energy storage device 16 comprises a bank of capacitors or supercapacitors. Secondary energy storage device 16 is electrically connectable to the input of DC/DC converter 22 by a first switch 40 to enable delivery of an equalization current to primary energy storage device 14 via power bus 20. Secondary energy storage device 16 is chargeable by drawing current generated by power generating device 11 from bus 20 when a switch 42 is closed. Secondary energy storage device 16 is also connectable directly to load 18 via bus 20 by means of a switch 44.

With reference to FIG. 6, this embodiment of the invention functions in four modes as follows:

1. Normal On

In the normal on mode power generating device 11 is operating and both primary energy storage device 14 and secondary energy storage device 16 are directly connected to power bus 20 (switches 40 and 42 are open; switch 44 is closed). In this mode secondary energy storage device 16, such as super capacitors, are delivering part of the total energy requirements to load 18. In this example, the low internal impedance of the capacitors allows the current drawn from the first energy storage device 14 (i.e. batteries) to be reduced, minimizing power demand and peukert effects on the batteries and lengthening their lifetime.

2. Current Equalization

In this mode the power generating device 11 is shut-down and the secondary energy storage device 16 is connected to the input of the DC/DC power converter 22 (switch 40 is closed; switches 42 and 44 are open). Device 10 is triggered to enter this mode when controller 30 detects that a first predetermined state of charge condition has occurred. For example, controller 30 preferably receives input from sensors 32 that detect the SOC of storage devices 14, 16 (FIG. 1). When controller 30 determines that the SOC of the primary energy storage device has exceeded a threshold amount (e.g. 80% of its full storage capacity) for a predetermined length of time, then a control signal is sent from controller 30 to power generating device 11 (FIG. 6) to shut-down device 11. Controller 30 also simultaneously causes switch 44 to open to remove the direct connection of secondary storage device 16 to power bus 20 and causes switch 40 to close to connect secondary storage device 16 to the input of DC/DC power converter 22. Power converter 22 continues to function by drawing energy out of secondary storage device 16 and delivering it to primary storage device 14 via bus 20 as an equalization charge. Ideally the supercapacitors or other secondary storage device 16 are sized so that they supply the total required equalization charge and the DC/DC power converter is designed to operate down to very low input voltages to extract the maximum energy from the supercapacitors.

During the equalization session a portion of the available equalization charge may also be drawn by load 18 depending upon its operating state. That is, in the case of lift trucks and the like having duty cycles characterized by fluctuating loads, it may often be the case no load is being drawn from the system during an equalization session, but this is not a requirement.

As will be apparent to a person skilled in the art, controller 30 may trigger device 10 to enter this equalization current mode when other predetermined equalization conditions are satisfied. For example, controller 30 may track the length of time which has elapsed from the end of the last recorded current equalization session or the depth of battery discharge(s) in the most recent normal on mode session.

3. Off

When controller 30 detects that the SOC of primary energy storage device 14 is fully charged, the system enters a complete shutdown mode. In this case all switches 40–44 may be opened.

4. Secondary Energy Storage Device Pre-charge

When controller 30 detects a second predetermined state of charge condition, power generating device 11 is restarted. For example, if controller 30 detects that the SOC of the first and/or second energy storage device 14, 16 has dropped below predetermined threshold level(s) due to load demands, power generating device 11 is restarted to help service the load and enable recharging of devices 14, 16. A pre-charge circuit comprising switch 42 (FIG. 6) is provided to limit the in-rush current initially delivered to energy storage device 16 (which may have a low impedance in the case of capacitors or supercapacitors). Once controller 30 detects that the voltage of the secondary energy storage device 16 approximates the voltage of DC power bus 20, switch 42 is opened, switch 44 is closed and the system enters the normal on operating mode (1) described above.

Figure 7:
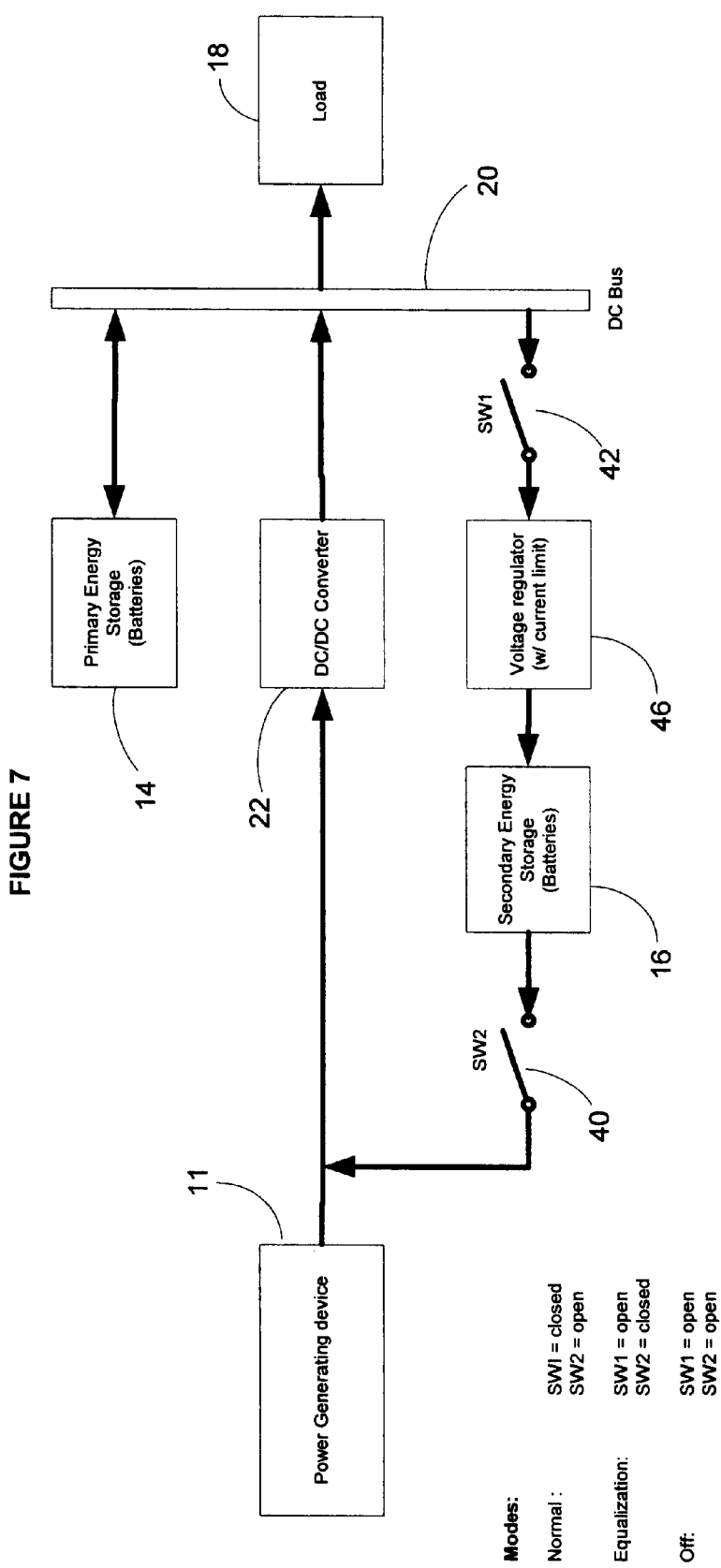
FIG. 7 is a schematic view of an alternative embodiment of the invention wherein the secondary energy storage device is a plurality of batteries isolated from the load.

FIG. 7 illustrates an alternative embodiment of the invention wherein the secondary energy storage device 16 comprises batteries rather than capacitors. In this embodiment of the invention, the secondary energy storage device 16 is not electrically connectable to load 18 in the normal operating mode. As in the first embodiment described above, the power generating device 11 may comprise a combination of fuel cell 12 and reformer 24 and secondary energy storage device 16 is electrically connectable to the input of DC/DC converter 22 by a first switch 40 to enable delivery of an equalization current to primary energy storage device 14. Secondary energy storage device 16 is chargeable by drawing current generated by power generating device 11 from a constant voltage power converter 46 or dedicated charger connectable to power bus 20 by a second switch 42. In this embodiment of the invention, secondary energy storage device 16 does not supply power directly to bus 20 to service load 18 during the normal operating mode. Rather, device 16 outputs power only during an equalization session when switch 40 is closed as described below.

With reference to FIG. 7, this embodiment of the invention functions in three modes as follows:

1. Normal On

In the normal on mode power generating device 11 is operating and the batteries comprising secondary energy storage device 16 are under charge (switch 42 is closed and switch 40 is open). In this mode the output of secondary energy storage device 16 is not connected to DC power bus 20 (i.e. device 16 is electrically connected to bus 20 via a voltage regulator or charger 46 solely for the purpose of receiving a charging current).

2. Current Equalization

In this mode the power generating device 11 is shut-down and the secondary energy storage device 16 is connected to the input of DC/DC power converter 22 (switch 40 is closed and switch 42 is open). As in the first embodiment described above, device 10 is triggered to enter this mode when controller 30 detects that a first predetermined state of charge condition has been achieved. Power converter 22 draws energy out of energy storage device 16 and delivers it to primary energy storage device 14 via bus 20 during the equalization session.

3. Off

When controller 30 detects that the SOC of primary energy storage device 14 is fully charged, the system enters a complete shutdown mode. In this case both switches 40 and 42 are open.

As in the first embodiment described above, when controller 30 detects a second predetermined state of charge condition, power generating device 11 is restarted and the system returns to the normal on mode. For example, if controller 30 detects that the SOC of the first and/or second energy storage device 14, 16 has dropped below predetermined threshold level(s) due to load demands, power generating device 11 is restarted to help service the load and enable recharging of devices 14, 16.

Figure 8:
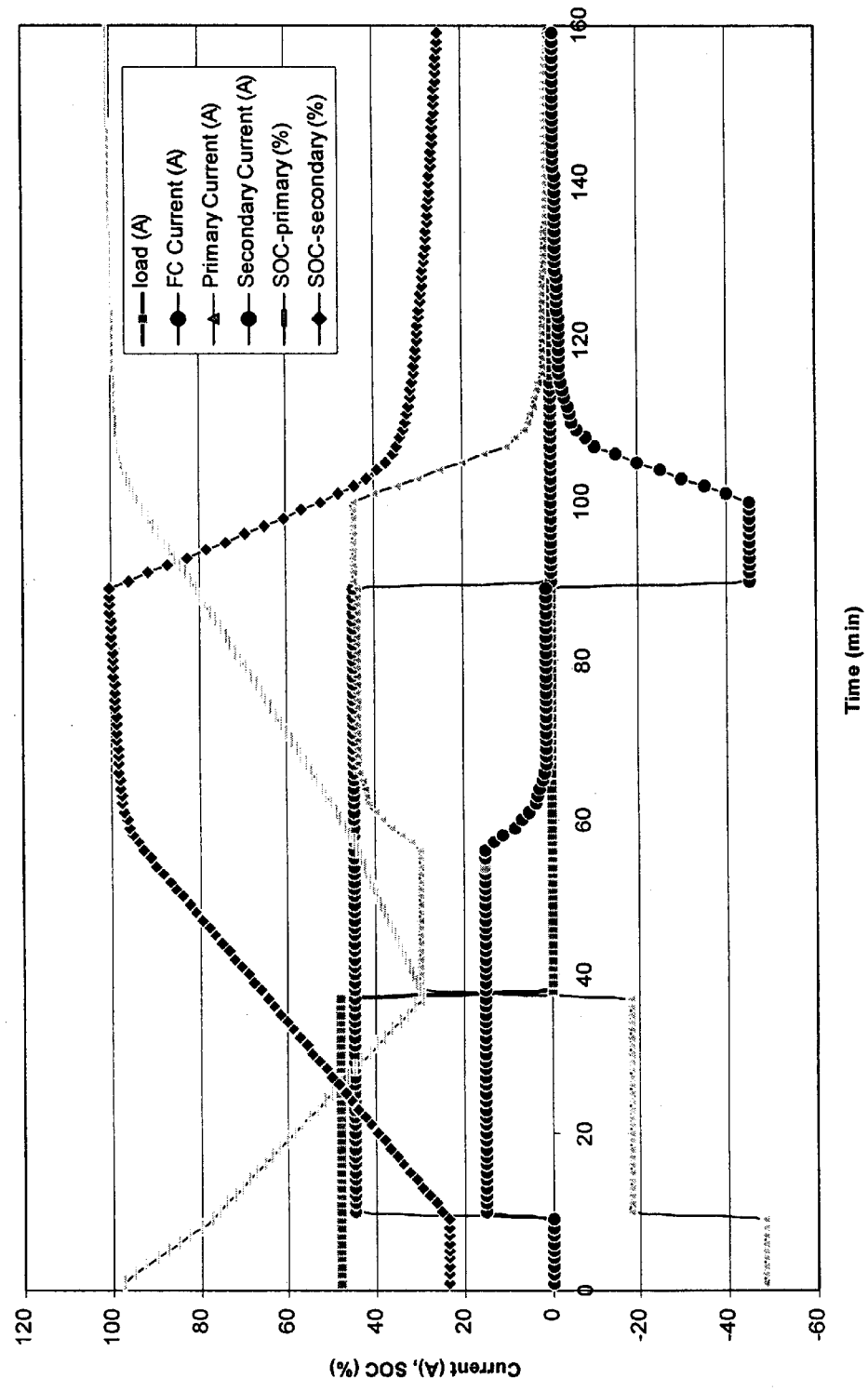
FIG. 8 is a graph illustrating an exemplary operating cycle utilizing the embodiment of FIG. 7.

FIG. 8 illustrates a hybrid energy storage device charge equalization scenario using the embodiment of FIG. 7. In this example the initial SOC of primary energy storage device 14 is approximately 100% (i.e. full capacity) and the SOC of secondary energy storage device 16 is approximately 20% of capacity from the previous equalization charge cycle. Further, in this example power generating device 11 comprises fuel cell 12. The system is initially in the "off" mode (i.e. both switches 40 and 42 are opened). At time t=0 a load of 50 A is applied to the system. The SOC of primary energy storage device 14 decreases as it services the load.

At time t=10 controller 30 detects a predetermined state of charge condition, namely that the SOC of primary energy storage device 14 has dropped below a predetermined SOC threshold for a predetermined period of time. Controller 30 then triggers operation of fuel cell 12 and switch 42 is closed to enable charging of secondary storage device 16. Current generated by fuel cell 12 is divided between storage devices 14, 16 and load 18. In this particular case a voltage regulator 46 with a 15 A limit regulates the current to secondary storage device 16 and the remaining current is delivered to load 18. As the load applied to the system is maintained the SOC of primary energy storage device 14 continues to drop while the SOC of secondary energy storage device 16 gradually increases.

At t=37 the load ceases and the additional current is diverted to charging primary energy storage device 14. The SOC of device 14 thus begins to increase.

At t=58 the SOC of secondary energy storage device 16 (and its internal resistance) rise to a point where device 16 self-regulates its current under a constant voltage charge regime. Less current is thus drawn by secondary energy storage device 16 and more is drawn by primary energy storage device 14. Eventually secondary energy storage device 16 reaches 100% SOC and continues to float charge. Switch 40 continues to be open and switch 42 is closed.

At t=90 controller 30 detects that a predetermined state of charge condition has been achieved. For example, controller detects that the SOC of primary energy storage device 14 has exceeded a predetermined threshold amount for a predetermined period of time. At this point controller 30 triggers fuel cell 12 to shut-down and switch 40 is closed. Equalization current from secondary energy storage device 16 is then fed through DC/DC power converter 22 and is delivered via bus 20 to primary energy storage device 14. Thus the SOC of secondary energy storage device 16 begins to decline while the SOC of primary energy storage device 14 increases in the absorption region.

At time t>90 primary energy storage device 14 continues to charge at constant voltage and self-regulates its current until it reaches 100% SOC. Primary energy storage device 14 continues to float until secondary energy storage device reaches it minimum charge threshold (20% SOC in this example) at which point controller 30 causes switch 40 to re-open to return the system to its initial state described above. The operating cycle is repeated when a further load is applied to the system.

Figure 9:
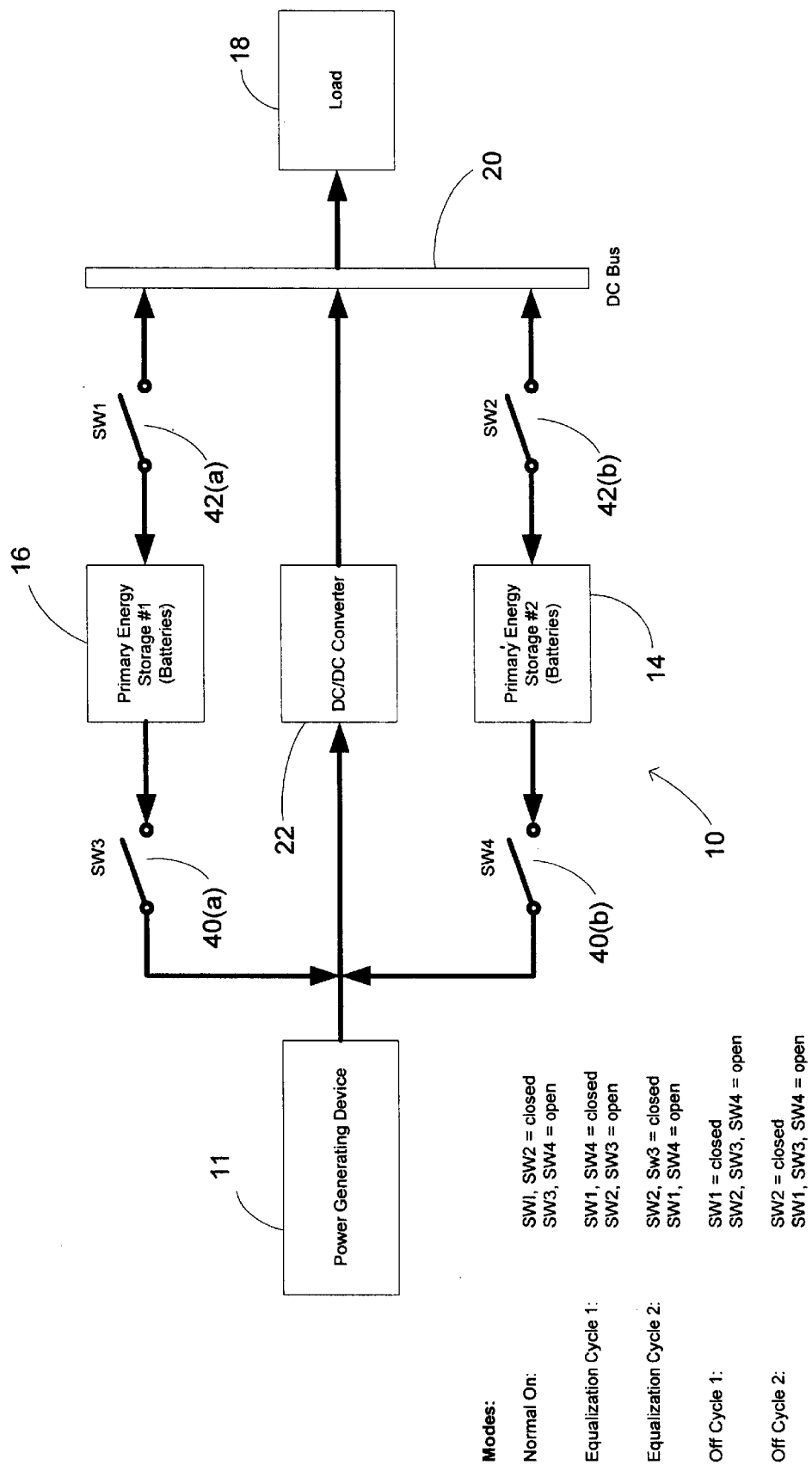
FIG. 9 is a schematic view of a further alternative embodiment of the invention wherein the secondary energy storage device is a battery connected in parallel to the primary energy storage device and electrically connectable to the load.

FIG. 9 illustrates a further alternative embodiment of the invention wherein both energy storage devices 14, 16 are batteries which deliver equalization current to each other in alternating operating sessions. In this embodiment both devices 14, 16 are connected to DC power bus 20 in parallel. The power generating module 11 continues to comprise a combination of fuel cell 12 and reformer 24. This embodiment of the invention functions in five modes as follows:

1. Normal On

In the normal operating mode both energy storage devices 14, 16 are connected directly to DC power bus 20 to help service load 18 (switches 40(a) and 40(b) are open and switches 42(a) and 42(b) are closed). The output of power generating device 11 is also electrically connected to bus 20 via power converter 22. In this embodiment of the invention devices 14, 16 are simultaneously charged and discharged through the normal course of operation.

2. Charge Equalization (Two Alternative Modes)

When controller 30 determines that a predetermined state of charge condition has been achieved, controller 30 causes power generating device 11 to shut-down. For example, the state of charge condition may be achieved when the state(s) of charge of devices 14, 16 (either singularly or combined) exceed threshold amounts, preferably still within their bulk charge regions. The two storage devices 14, 16 are then isolated from one another so that one of the devices can be used to provide an equalization charge to the other device through DC/DC converter 22. In the case of charge equalization of storage device 14 by providing charging current from storage device 16, switches 40(b) and 42(a) are closed and switches 40(a) and 42(b) are opened. Alternatively, in the case of equalization of storage device 16 by providing charging current from storage device 14, switches 40(a) and 42(b) are closed and switches 40(b) and 42(a) are opened.

At the end of the equalization session one storage device 14, 16 is fully charged and the other storage device 14, 16 is left at a lower, but non-overdischarged SOC. In the subsequent operating cycle the storage device 14, 16 which was fully charged in the previous cycle is used to equalize the other device 14, 16. In this manner both storage devices 14, 16 are maintained in optimum health and power generating device 11 is not required to operate in a low power output regime as in the other embodiments described above. This embodiment of the invention has the advantage of utilizing all of combined storage capacity of devices 14, 16 and results in very efficient use of power generated by device 11 since most charging and discharging of devices 14, 16 (e.g. conventional lead acid batteries) is done in the bulk charge region.

3. Start of Operation (Optional)

When controller 30 determines that a predetermined state of charge condition has been achieved (for example the SOC of the last energy storage device 14, 16 to receive a full charge drops below a threshold level for a predetermined length of time), power generating device 11 is turned on. Further, the storage device 14, 16 which was fully charged in the previous equalization session is connected to DC bus 20 to initially supply all of the power requirements of load 18 until the measured SOC of both devices 14, 16 is approximately equal. The other storage device 14, 16, which delivered the equalization charge in the previous equalization session, is then connected to DC bus 20. The system is then in the normal on mode described above wherein both devices 14, 16 service the load.

4. Off

When controller 30 determines that one of storage devices 14, 16 has achieved 100% SOC, switches 40(a) and 40(b) are opened to interrupt the equalization circuit. The remaining switches 42(a) and 42(b) are left in their last state (one of storage devices 14, 16 remains electrically connected to DC bus 20 and hence load 18 to help service future load demands).

As will be apparent to a person skilled in the art, other equivalent means for configuring a plurality of storage devices 14, 16 may be envisaged for delivering an equalization charge, thereby avoiding the need to operate power generating device 11 in a low power output mode. As indicated above, power generating device 11 may comprise the combination of a fuel cell 12 and reformer 24. In some embodiments of the invention, the system may be configured so only fuel cell 12 is shut-down in the shut-down or non-charging mode and reformer 24 (or some other component of power generating device 11) continues to operate. For example, reformer 24 (or some other component of power generating device 11) may continue to operate in a stand-by or low output mode while fuel cell 12 is shut-down to retain heat within the system until another charging session is initiated. Many other alterations and modifications are possible in the practice of this invention without departing from the spirit or scope thereof. Accordingly, the scope of the invention is to be construed in accordance with the substance defined by the following claims.

What is claimed is:

1. A hybrid power supply system for supplying electrical power to a load comprising:
   (a) a power generating device;
   (b) a first energy storage device chargeable by said power generating device and electrically connectable to said load;
   (c) a first detector for measuring the state of charge of said first energy storage device;
   (d) a second energy storage device chargeable by said power generating device and electrically connectable to said first energy storage device; and
   (e) a controller for receiving input from said first detector, wherein said controller causes said second energy storage device to provide an equalization current to said first energy storage device when said controller detects a first predetermined state of charge condition.

2. The system of claim 1, wherein said power generating device is operable in alternating charging and shut-down modes and wherein said controller causes said power generating device to switch from said charging mode to said shut-down mode when said first predetermined state of charge condition is detected.

3. The system of claim 2, wherein said controller detects said first predetermined state of charge condition when the measured state of charge of said first energy storage device exceeds a first threshold value for a predetermined length of time.

4. The system of claim 2, wherein said power generating device comprises a fuel cell system.

5. The system of claim 2, wherein said second energy storage device delivers said equalization charge to said first energy storage device while said power generating device is in said shut-down mode until said first energy storage device is fully charged.

6. The system of claim 2, further comprising a DC/DC converter electrically connected between said power generating device and said first and second energy storage devices.

7. The system of claim 6, wherein said DC/DC converter draws energy from at least one of said first and second energy storage devices when said power generating device is in said shut-down mode.

8. The system of claim 2, wherein said controller causes said power generating device to switch from said shut-down mode to said charging mode when said controller detects a second predetermined state of charge condition.

9. The system of claim 8, wherein said power generating device delivers current to said load and said first and second energy storage devices in said charging mode.

10. The system of claim 9, further comprising a second detector for measuring the state of charge of said second energy storage device, wherein said controller receives input from said second detector.

11. The system of claim 10, wherein said controller detects said second predetermined state of charge condition when the measured state of charge of at least one of said first or second energy storage devices falls below a second threshold value for a predetermined length of time.

12. The system of claim 11 wherein said second energy storage device is electrically connectable to said load.

13. The system of claim 12, further comprising a pre-charge circuit to deliver a pre-charge to said second energy storage prior to electrically connecting said second energy storage device to said load.

14. The system of claim 12, wherein said controller causes said second energy storage device to deliver current to said load when said controller detects a third predetermined state of charge condition.

15. The system of claim 14, wherein said controller detects said third predetermined state of charge condition when the measured state of charge of said second energy storage device achieves a third threshold value for a predetermined length of time.

16. The system of claim 7, wherein said first energy storage device is a battery and said second energy storage device is a capacitor.

17. The system of claim 7, wherein said first and second energy storage devices are batteries.

18. The system of claim 17, wherein said batteries are connected in parallel with said DC/DC converter and said load.

19. The system of claim 3, wherein said first threshold value is a state of charge within the range of between approximately 75–95% of the full storage capacity of said first energy storage device.

20. The system of claim 11, wherein said second threshold value is a state of charge within the bulk charge region of one of said first or second energy storage devices.

21. The system of claim 20, wherein said second threshold value is a state of charge equal to approximately 70–80% of the full storage capacity of said primary energy storage device.

22. The system of claim 15, wherein said third threshold value is a state of charge approximately equal to the state of charge of said first storage device when said states of charge of said first and second energy storage devices are measured simultaneously.

23. The system of claim 19, wherein said second storage device is sized such that the storage capacity of said second energy storage device is equal to approximately 125% of the charge necessary to charge said first energy storage device from said first threshold to full storage capacity.

24. A method of operating a hybrid power supply apparatus including a power generating device adjustable between charging and shut-down modes and further including first and second energy storage devices chargeable by said power generating device, at least one of the first and second energy storage devices being connected to a load for delivering electrical power thereto, said method comprising:
    (a) operating said power generating device in said charging mode to deliver charging current to said first and second energy storage devices;
    (b) repeatedly measuring the state of charge of said first energy storage device;
    (c) adjusting said power generating device from said charging mode to said shut-down mode when the measured state of charge of said first energy storage device satisfies a first predetermined state of charge condition; and
    (d) providing an equalization current from said second energy storage device to said first energy storage device while said power generating device is in said shut-down mode until the measured state of charge of said first energy storage device reaches approximately its full storage capacity.

25. The method of claim 24, wherein said first predetermined state of charge condition is achieved when said measured state of charge of said first energy storage device exceeds a first threshold value for a predetermined period of time, wherein said first threshold value is a percentage of the full storage capacity of said first energy storage device.

26. The method of claim 25, further comprising:
    (e) adjusting said power generating device from said shut-down mode to said charging mode when the measured state of charge of said first energy storage device is below a second threshold value for a predetermined period of time.

27. The method of claim 24, wherein both of said first and second energy storage devices are electrically connectable to said load for delivering electrical power thereto and wherein said method further comprises:
    (e) adjusting said power generating device from said shut-down mode to said charging mode when the measured state of charge of said first energy storage device is below a second threshold value for a predetermined period of time;
    (f) repeatedly measuring the state of charge of said second energy storage device;
    (g) delivering a pre-charge current from said power generating device or said first energy storage device to said second energy storage device; and
    (h) electrically connecting said second energy storage device to said load when the measured state of charge of said second energy storage device exceeds a third threshold value for a predetermined period of time.

28. The method of claim 27, wherein said third threshold value is a state of charge approximately equal to the state of charge of said first energy storage device when said states of charge of said first and second energy storage devices are measured simultaneously.

29. The method of claim 27, wherein said first and second energy storage devices are charged simultaneously.

30. The method of claim 29, wherein said first and second energy storage devices are discharged simultaneously.

31. The method of claim 24, wherein said power generating device comprises a fuel cell and said apparatus further comprises a DC/DC converter for delivering current from said fuel cell to at least said first energy storage device.

32. The method of claim 31, further comprising connecting the output of said second energy storage device to the input of said DC/DC converter when the measured state of charge of said first energy storage device exceeds said first threshold value for a predetermined period of time.

33. The method of claim 27, wherein said power generating device is adjusted from said charging mode to said shut-down mode when the combined states of charge of said first and second energy storage devices exceed a predetermined amount.

34. The method of claim 27, wherein said apparatus is operable in successive alternating first and second operating cycles, wherein said second energy storage device delivers an equalization current to said first energy storage device when said power generating device is in said shut-down mode in said first operating cycle, and wherein said first energy storage device delivers an equalization current to said second energy storage device when said power generating device is in said shut-down mode in said second operating cycle.

35. A hybrid power supply system for supplying electrical power to a load comprising:
   (a) a power generating device operable in alternating charging and non-charging modes;
   (b) a first energy storage device chargeable by said power generating device and electrically connectable to said load;
   (c) a first detector for measuring the state of charge of said first energy storage device;
   (d) a second energy storage device chargeable by said power generating device and electrically connectable to said first energy storage device; and
   (e) a controller for receiving input from said first detector, wherein said controller causes said second energy storage device to provide an equalization current to said first energy storage device when said controller detects a first predetermined state of charge condition, and wherein said controller causes said power generating device to switch from said charging mode to said non-charging mode when said first predetermined state of charge condition is detected.

36. The system of claim 35, wherein said power generating device comprises a fuel cell and a fuel processor supplying fuel to said fuel cell, wherein at least said fuel cell is adjusted to a shut-down state when said power generating device is in said non-charging mode.

37. A method of operating a hybrid power supply apparatus including a power generating device adjustable between charging and non-charging modes and further including first and second energy storage devices chargeable by said power generating device, at least one of the first and second energy storage devices being connected to a load for delivering electrical power thereto, said method comprising:
   (a) operating said power generating device in said charging mode to deliver charging current to said first and second energy storage devices;
   (b) repeatedly measuring the state of charge of said first energy storage device;
   (c) adjusting said power generating device from said charging mode to said non-charging mode when the measured state of charge of said first energy storage device satisfies a first predetermined state of charge condition; and
   (d) providing an equalization current from said second energy storage device to said first energy storage device while said power generating device is in said non-charging mode until the measured state of charge of said first energy storage device reaches approximately its full storage capacity.

* * * * *